United States Patent [19]
Rademaker

[11] Patent Number: 6,161,955
[45] Date of Patent: Dec. 19, 2000

[54] DEVICE FOR KNEADING DOUGHS AND PASTRIES

[75] Inventor: Mattheus Anthonius Rademaker, Culemborg, Netherlands

[73] Assignee: Rademaker B.V., Netherlands

[21] Appl. No.: 08/927,902

[22] Filed: Sep. 11, 1997

[30] Foreign Application Priority Data

Sep. 12, 1996 [NL] Netherlands .......................... 1004020

[51] Int. Cl.[7] ................................ A21C 1/06; B01F 7/12
[52] U.S. Cl. ................................ 366/97; 366/98; 366/99; 366/288; 366/307; 366/325.4
[58] Field of Search .................. 366/97, 98, 99, 366/325.4, 329.1, 288, 307

[56] References Cited

U.S. PATENT DOCUMENTS

| | | |
|---|---|---|
| 52,518 | 2/1866 | Blasse . |
| 374,706 | 12/1887 | Rosenkranz . |
| 826,839 | 7/1906 | Fay . |
| 1,426,444 | 8/1922 | Allison . |
| 1,468,826 | 9/1923 | Minney . |
| 1,847,227 | 3/1932 | Ringwald . |
| 1,854,732 | 4/1932 | Beran . |
| 1,988,561 | 1/1935 | Lauterbur et al. . |
| 3,031,980 | 5/1962 | Bonomo et al. . |
| 3,337,508 | 8/1967 | Bachmann et al. . |
| 3,362,793 | 1/1968 | Massoubre . |
| 3,407,046 | 10/1968 | Massoubre . |
| 4,148,590 | 4/1979 | Sotirianos . |
| 4,183,674 | 1/1980 | Sudo et al. . |
| 5,028,141 | 7/1991 | Stiegelmann . |
| 5,310,569 | 5/1994 | Muller ...................................... 426/504 |
| 5,421,713 | 6/1995 | Backus et al. ........................... 425/209 |
| 5,466,334 | 11/1995 | Fredriksson et al. . |
| 5,510,073 | 4/1996 | Kaegi et al. . |
| 5,556,201 | 9/1996 | Veltrop et al. . |
| 5,570,955 | 11/1996 | Swartwout et al. ..................... 366/264 |
| 5,580,167 | 12/1996 | Drocco . |
| 5,758,962 | 6/1998 | Ismar . |

FOREIGN PATENT DOCUMENTS

| | | |
|---|---|---|
| 0 645 092 A1 | 3/1995 | European Pat. Off. . |
| 350331 | 1/1906 | France . |
| 596809 | 11/1925 | France . |
| 192394 | 12/1907 | Germany . |
| 443856 | 5/1927 | Germany . |
| 463113 | 3/1937 | United Kingdom . |
| 1245222 | 9/1971 | United Kingdom . |

*Primary Examiner*—Joseph W. Drodge
*Assistant Examiner*—Michael Fleming
*Attorney, Agent, or Firm*—Banner & Witcoff, Ltd.

[57] ABSTRACT

A device for kneading doughs and pastes consisting of a type of flour, a liquid such as water and other appropriate additives, which device consists substantially of a horizontal lying elongated trough provided with a curved bottom having standing side walls connecting thereto, and a rotatably driven mixing and kneading gear operating in the trough, wherein the mixing and kneading gear consists of at least two tubes or rods which are driven around the center line of the trough bottom and received in rotatable supports on either end of the trough, wherein the diameters of the rotating tubes or rods are practically identical and the circumscribed circle lies a short distance from the trough bottom, such that many types of dough mass can be made and the mixing and kneading gear is easy to clean.

17 Claims, 3 Drawing Sheets

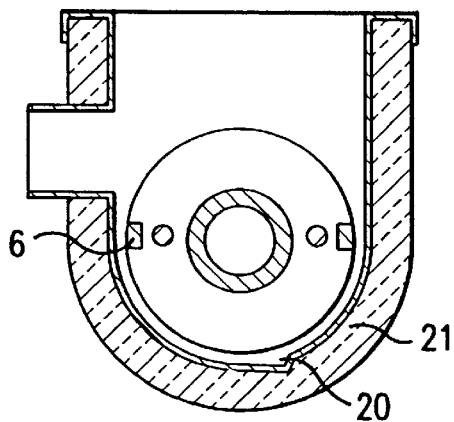
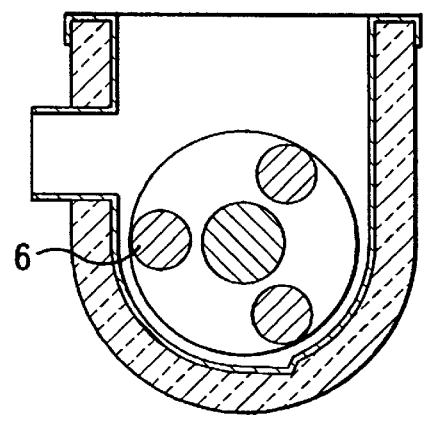
FIG. 3a    FIG. 3b
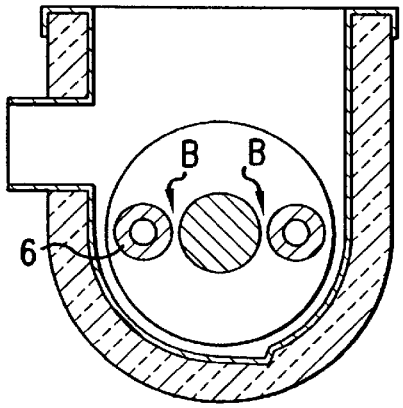
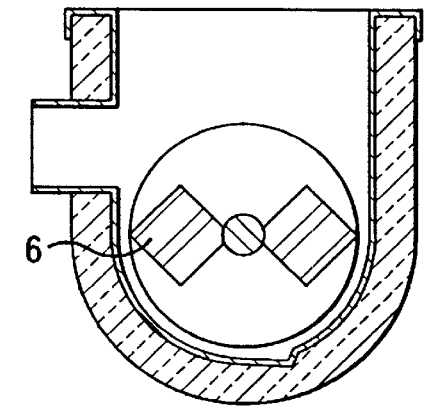
FIG. 3c    FIG. 3d
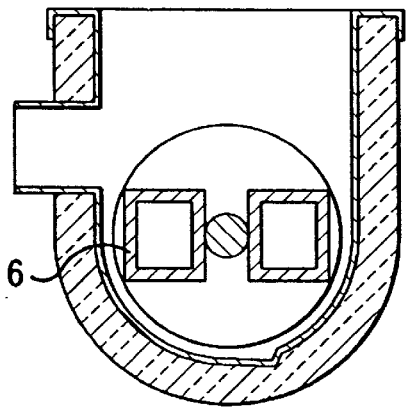
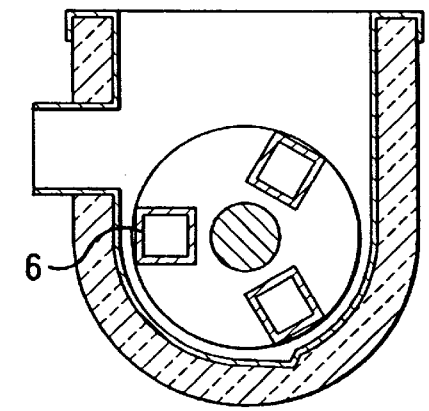
FIG. 3e    FIG. 3f

DEVICE FOR KNEADING DOUGHS AND PASTRIES

SUMMARY OF THE INVENTION

The invention relates to a device for kneading a mass consisting of a type of flour, a liquid such as water and other appropriate additives, which device consists substantially of a lying elongate trough provided with a curved bottom having standing side walls connecting thereto, and rotatably driven mixing and kneading gear operating in the trough.

BACKGROUND OF THE INVENTION

It is generally known to mechanically knead a mixture of flour and other components in order to enable preparation of mass products in industrial manner for subsequent processing. Kneading of a particular product usually takes place in a kneading machine which is intended for this purpose and of which a number of embodiments are known. It is thus known to knead the dough in a bin-like trough in which a kneading mechanism rotates round a vertical shaft. It is also known to cause the kneading to take place in a more or less continuous process through a trough, wherein a kneading gear rotates round a horizontal shaft. The problem in these latter types of devices is that the process cannot be performed for all types of dough mass. This is because of the complicated construction of the kneading mechanism.

BRIEF DESCRIPTION OF THE INVENTION

The invention has for its object to obviate the above stated drawbacks and to provide a kneading device wherein all possible types of dough can be manufactured irrespective of the composition thereof.

The device according to the invention is distinguished in that the mixing and kneading gear consists of at least one tube or rod which is driven round the centre line of the trough bottom and received in rotatable supports on either end of the trough, wherein the diameters of the rotating tubes or rods are practically identical and the circumscribed circle lies a short distance from the trough bottom.

Due to the tube or rod acting only in lengthwise direction of the trough no disruption is caused when during infeed of the mixture on the one side of the trough an obstacle is encountered by the mixture for kneading during transport through the trough, whereby an undisturbed kneading process takes place to the outlet on the other side of the trough. Since the tubes move closely along the bottom of the trough it has been shown experimentally that the kneading process is performed optimally.

According to a further development of the invention the device is further provided with a lying central tube or rod between the rotating tubes which is stationary relative to the trough. The central tube or rod will preferably have a diameter of 1 to 1.25 times the diameter of the rotating tubes or rods. A second "fixed" wall is hereby created opposite the trough wall, thus resulting in a double kneading action on the mixture in the trough.

It is recommended according to the invention to arrange the non-rotating tube or rod fixedly in the end support, whereby it will not co-rotate on its own longitudinal axis during kneading.

The cross-section of the tube is preferably circular but can, if desired, have any shape varying from the circular, for instance a square shape.

The trough is preferably provided with an outlet opening in a standing side wall thereof. This causes an outflow of the dough at the position of a plane slightly above the axis of rotation of the kneading gear, whereby a continuous "flow" of dough is discharged from the trough.

In preference the trough is open at the top, whereby the mixture, which is provided beforehand with a quantity of moisture such as water, can be fed freely into the trough from above on the end thereof remote from the outlet opening. If the trough is closed the invention then proposes to arrange an infeed opening for the mixture in the opposite side wall, thus ensuring that a lengthwise flow of the mixture for kneading takes place through the trough.

For cleaning purposes it is recommended to arrange the trough for up and down movement relative to the support frame, which likewise carries the kneading gear, in order to separate the trough from the kneading gear and increase the accessibility thereto.

BRIEF DESCRIPTION OF THE DRAWINGS

The invention is further elucidated in the figure description hereinbelow of a number of embodiments. In the drawing.

DETAILED DESCRIPTION OF THE INVENTION

Figure 1:
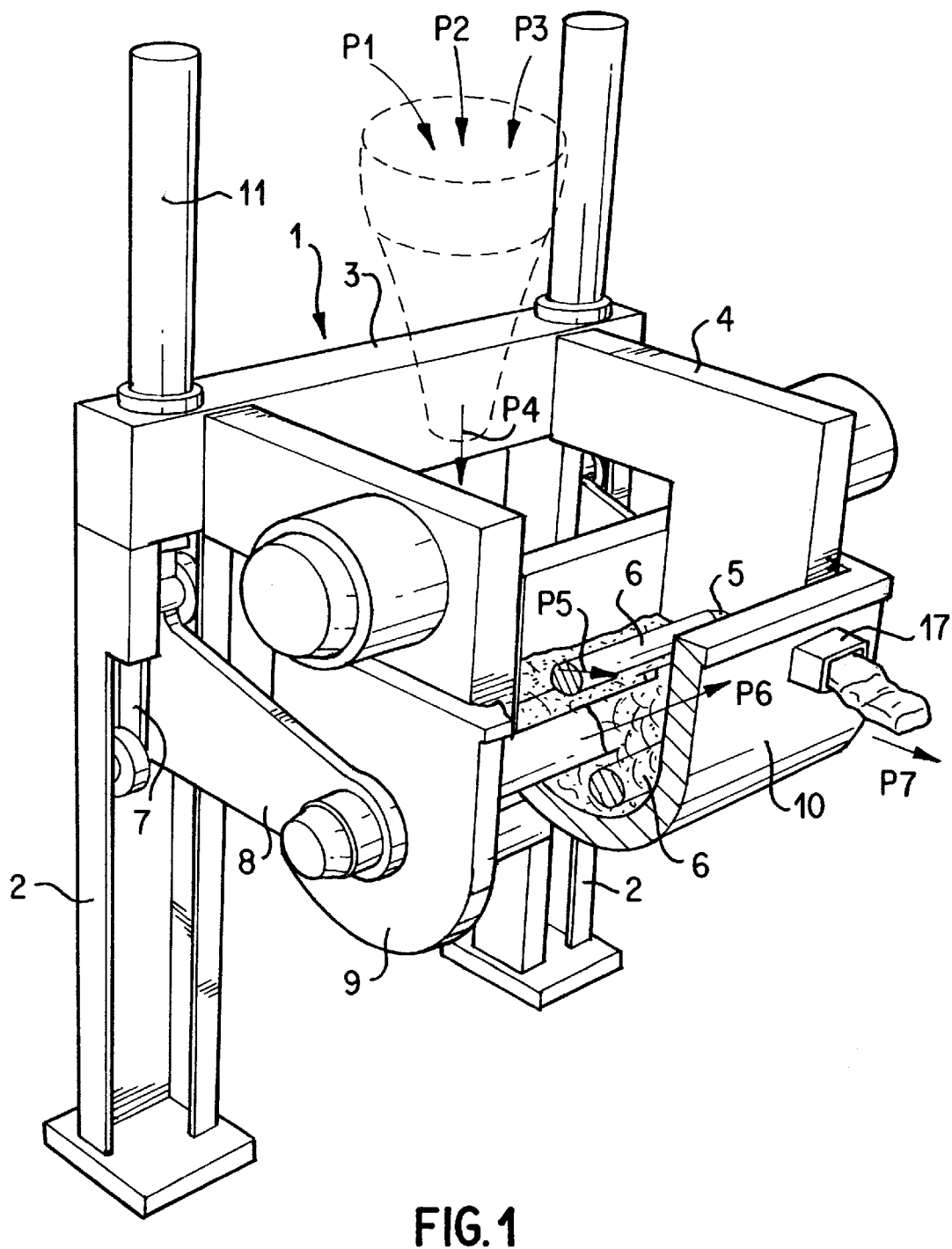
FIG. 1 shows a perspective view of a first embodiment of the device wherein a part of the trough is broken away.

Designated in FIG. 1 with the numeral 1 is the main frame of the device which consists here of two posts 2 placed at a mutual distance and mutually connected at the top by a main beam 3. Two L-shaped supports 4 located at a mutual distance are mounted on main beam 3, wherein on the bottom end of the downward pointing leg is arranged a rotating disc-like support 5 (see also FIG. 2) which serves to support two tube or rod-like kneading elements 6 which are further elucidated hereinbelow.

Posts 2 each carry an up and downward movable carriage 7 which is provided with an outward pointing support plate 8, on the end of which the end walls 9 of a trough 10 are rotatably mounted. Trough 10 has a substantially U-shaped form open to the top, wherein it is noted that the downward pointing legs of L-shaped support 4 are arranged adjacently of the end wall 9 of trough 10, see FIG. 1.

Figure 2:
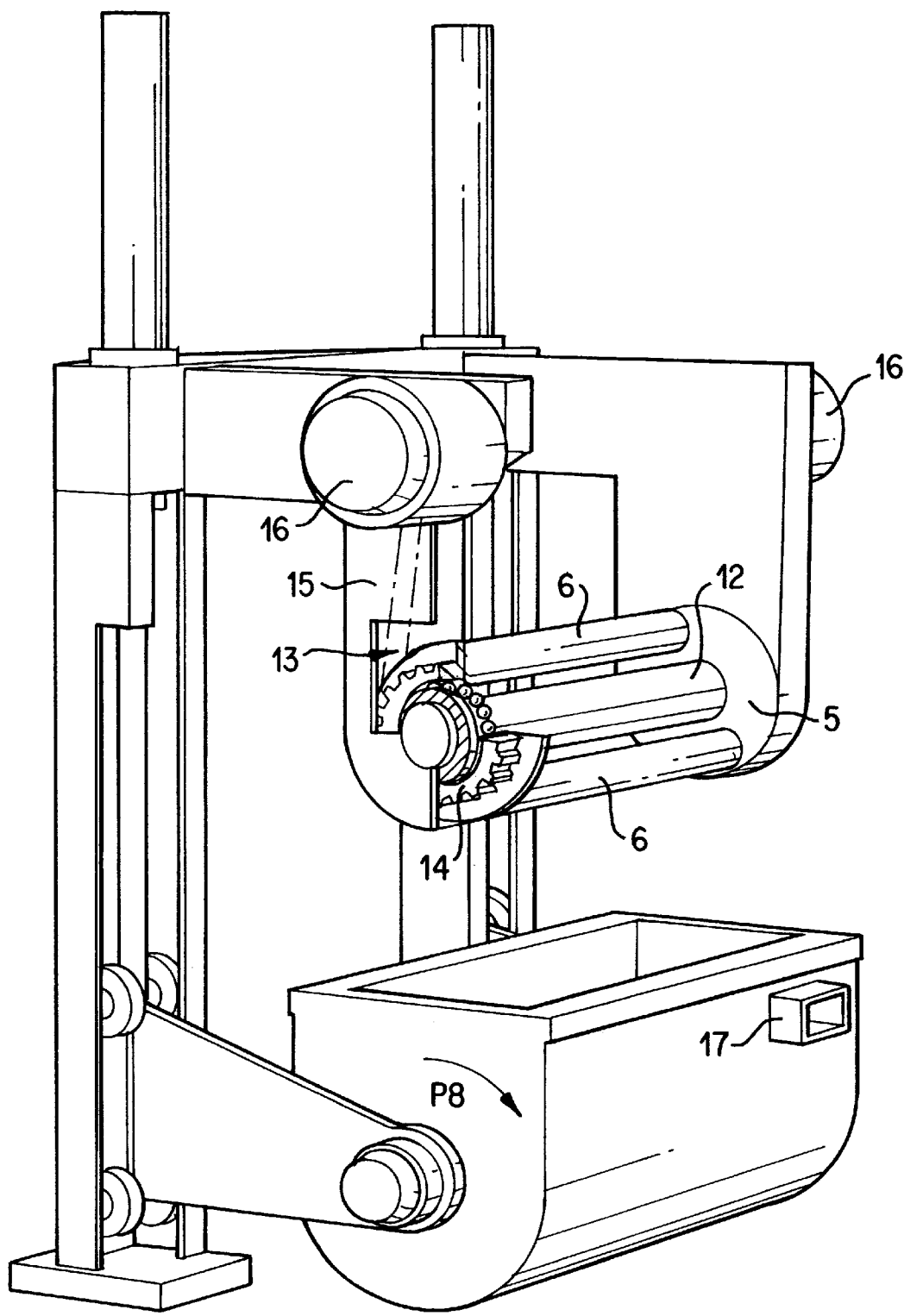
FIG. 2 shows a perspective view corresponding with FIG. 1 in a second position of use of the device, FIG. 3a, b, c, d, e and f show standing sections through the trough with kneading gear arranged therein and provided with different embodiments of tube or rod-like kneading elements.

Carriage 7 of trough 10 is moved up and downward by means of cylinders 11 so that trough 10 can be shifted from the active position shown in FIG. 1 to a downward placed position as according to FIG. 2.

According to the main feature of the invention the kneading gear consists of at least one lying rod-like or tubular body 6 which is rotatable round the centre line of the trough bottom A—A when the trough is in the active position of FIG. 1. In the embodiment shown in FIGS. 1 and 2 a fixed tube or rod-like kneading element 12 is mounted non-rotatably in the downward pointing legs of the L-shaped supports 4. The disc-like supports 5 rotate round this rod 12 while carrying therewith the ends of kneading elements 6 preferably arranged fixedly in disc 5.

Driving of disc-like elements 5 takes place via a transmission 13 of random type which is arranged in supports 4. This transmission consists here of a toothed wheel 14 which is connected to disc 5 and around which is trained a chain 15 which is driven by a motor 16.

Trough 10 is provided on the outer standing side wall with an outlet opening 17.

The above described device operates as follows. The ingredients, schematically indicated with arrows P1, P2 and P3 are fed into an infeed hopper which is shown in dashed lines above the device in FIG. 1. This mixture runs out as according to arrow P4 into the one side, i.e. on the front side of trough 10 in FIG. 1, and will cause this to be filled to a certain extent on one side. By rotating the discs 5 by means of motors 16, the rods 6 will begin to rotate round the fixed rod 12 and the mixture will be kneaded. Because the circle circumscribed round the rotating rods 6 runs closely along the trough bottom of trough 10, a kneading action is applied to the mixture between the rod 6 and the trough bottom. As a result of feeding the mixture on the one side, the mixture for kneading will move in the direction of arrow P6 through trough 10. Because there is no obstacle present in axial direction this transport will take place unimpeded until the fully kneaded mixture arrives at the outlet opening 17. As a result of the pushing action of rods 6 the kneaded mixture is carried stepwise out of the opening 17 and can be transported further as according to arrow P7 on a transporting device (not shown) to a further processing machine.

When the work is finished the trough 10 can be moved downward by energizing cylinder 11 which moves carriage 7 downward, whereafter the trough can be tilted as according to arrow P8 and becomes accessible for cleaning purposes. The kneading gear can likewise be cleaned easily since it is wholly exposed.

FIGS. 3a–3f shows a number of embodiments of possible forms of the kneading gear.

FIG. 3a has a fixed central tube around which two comparatively thin rods are mounted parallel to and diametrically opposite each other in the rotating supports 5.

FIG. 3b shows three rods which are mounted in the supports 5 without a central fixed rod.

FIG. 3c shows two tubular peripheral tubes with a fixed central rod, this in accordance with the embodiment of FIG. 1.

FIG. 3d shows a square form of kneading elements mounted in the rotating support 5.

FIG. 3e shows two square tubes.

FIG. 3f shows three square tubes.

The invention is based on the property that the peripheral circle corresponding with the periphery of the rotating support runs closely along the bottom of the trough, whereby a kneading action results between the rotating rods and the bottom of the trough. If there is a fixed central rod, see FIG. 3a and c, a second gap-like space B is then created in which a kneading action occurs.

It is also possible to provide the bottom of the trough with a protruding portion 20 whereby an additional kneading action is also applied to the mixture. The protruding portion can be of random type and is embodied here as a channel-like fold, this such that the lower bottom part runs tangentially to the imaginary inner circle of the trough bottom.

It is noted that the trough can be further provided with a hollow space 21 in which can flow a heating or cooling medium.

The invention is not limited to the above described embodiments.

What is claimed is:

1. Device for kneading doughs and pastes consisting of flour, a liquid and appropriate additives, said device comprising:

a horizontally elongated trough having a curved bottom around a horizontal center line, a pair of longitudinally extending standing side walls extending upwardly from the curved bottom, and opposing end walls, said curved bottom extending from one side wall to the other;

a rotatably driven mixing and kneading gear operating in the trough, wherein the mixing and kneading gear consists of at least two horizontally elongated tubes or rods which are rotatingly driven around the horizontal center line of the trough bottom and received in rotatable supports, each rotatable support being located in a respective elongated support at an opposite longitudinal end of said trough, wherein the rotating tubes or rods have substantially the same size, and portions of the tubes or rods farthest from the horizontal center line form a circumscribed circle when rotated, and the circumscribed circle formed by said tubes or rods when driven lies a short distance from the trough bottom; and a horizontally elongated central tube or rod which is stationary relative to the trough, said central stationary tube or rod is arranged between the rotating tubes or rods and is separate from the rotating tubes or rods, said central stationary tube or rod being non-rotatably secured to said elongated supports and extending substantially the entire length of the trough in the longitudinal direction, said center line passing through said central stationary tube or rod.

2. Device as claimed in claim 1, wherein each of the rotating horizontally elongated tubes or rods is fixedly mounted to the rotatable supports.

3. Device as claimed in claim 1, wherein the stationary and rotating horizontally elongated tubes or rods are circular in cross-section, and wherein the diameter of the fixed tube or rod is 1 to 1.25 times than that of the rotating tubes or rods.

4. Device as claimed in claim 1, wherein the cross-section of each rotating tube or rod is non-circular.

5. Device as claimed in claim 1, wherein said stationary tube or rod is circular in cross-section, said device has two rotating tubes or rods that are circular in cross-section, and the radius of curvature of the trough bottom is slightly larger than half the sum of the diameters of the two rotating tubes or rods and the stationary tube or rod.

6. Device as claimed in claim 1, wherein the trough bottom has a horizontally-elongated protruding portion to provide additional kneading action.

7. Device as claimed in claim 6, wherein the protruding portion is formed by a stepped bottom part of the trough.

8. Device as claimed in claim 1, wherein the trough further includes an outlet opening extending through one of the side walls enabling kneaded doughs and pastes to discharge from the trough through said outlet opening.

9. Device as claimed in claim 8, wherein the trough further includes an inlet region located on the side of the horizontal center line opposite from said outlet opening.

10. Device as claimed in claim 8, wherein the outlet opening is located close to a longitudinal end of the trough, said trough further including an inlet region located near the longitudinal end of the trough opposite from the outlet opening.

11. Device as claimed in claim 1, further comprising an outlet opening and an inlet region, said outlet opening located close to a longitudinal end of the trough, and said inlet region located near the longitudinal end of the trough opposite from the outlet opening.

12. Device as claimed in claim 1, wherein the mixing and kneading gear and the trough are accommodated in a common main frame, said device further having a moving device that vertically moves the mixing and kneading gear and the trough relative to each other for separation therebetween.

13. Device as claimed in claim 12, wherein said end walls of said trough are pivotally coupled to said frame permitting pivotal movement between the trough and frame when said trough is vertically moved away from the mixing and kneading gear.

14. Device as claimed in claim 1, wherein a wall portion of said trough is hollow permitting the flow of a heating or cooling medium therein.

15. Device for kneading doughs and pastes consisting of flour, a liquid and appropriate additives, said device comprising:

- a horizontally elongated trough having a curved bottom around a horizontal center line, a pair of longitudinally extending standing side walls extending upwardly from the curved bottom, and opposing end walls, said curved bottom extending from one side wall to the other;
- a rotatably driven mixing and kneading gear operating in the trough, wherein the mixing and kneading gear consists of at least two horizontally elongated tubes or rods which are rotatingly driven around the horizontal center line of the trough bottom and received in rotatable supports located on opposite longitudinal ends of said trough, wherein the rotating tubes or rods have substantially the same size, and portions of the tubes or rods farthest from the horizontal center line form a circumscribed circle when rotated, and the circumscribed circle formed by said tubes or rods when driven lies a short distance from the trough bottom; and
- wherein the mixing and kneading gear and the trough are accommodated in a common main frame, said device further having a moving device that vertically moves the mixing and kneading gear and the trough relative to each other for separation therebetween, said end walls of said trough being pivotally coupled to said frame for permitting pivotal movement between the trough and frame and for restraining the trough against horizontal movement relative to said mixing and kneading gear when said trough is vertically moved away from the mixing and kneading gear.

16. Device as claimed in claim 15, wherein said moving device is a vertically mounted cylinder.

17. Device as claimed in claim 15, wherein the trough further includes an outlet opening extending through one of said side walls enabling kneaded doughs and pastes to discharge from the trough through said outlet opening.

* * * * *